Nov. 7, 1950  J. F. MORSE  2,528,901
COMBINED MANUAL AND FOLLOW-UP PRESSURE FLUID POWER UNIT
Filed Oct. 6, 1944  3 Sheets-Sheet 1

INVENTOR
JOHN F. MORSE
BY Ely & Frye

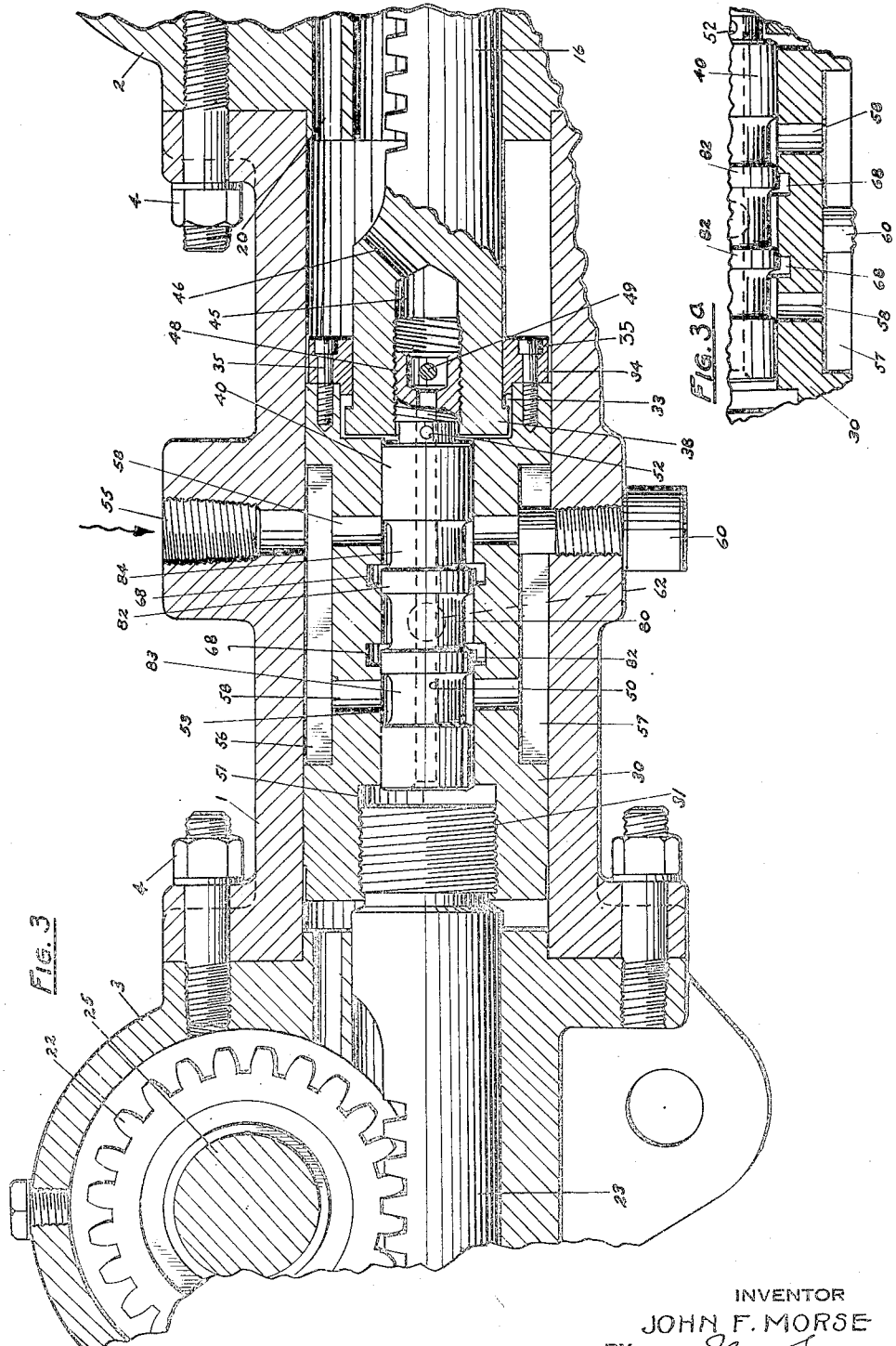

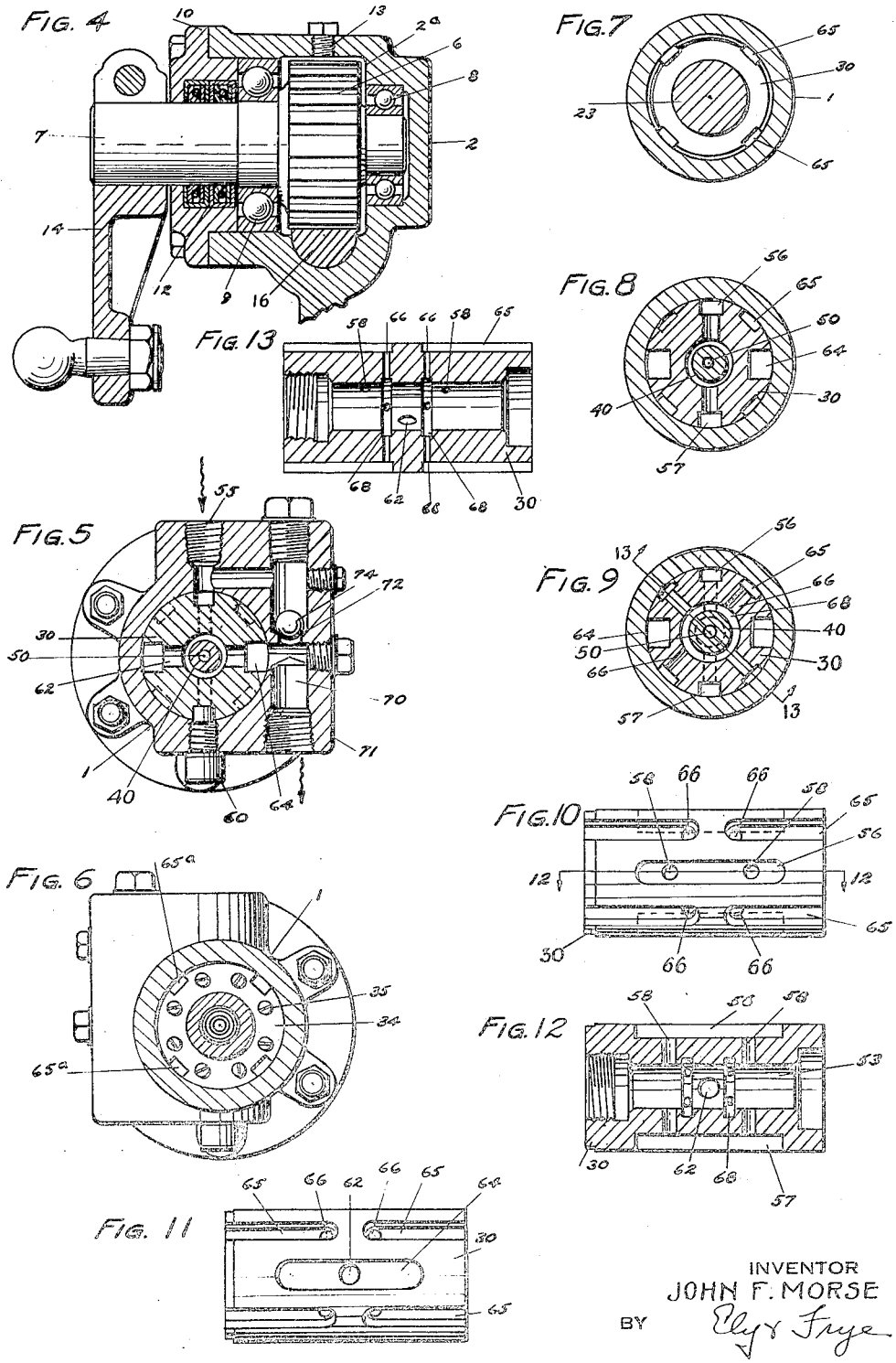

Patented Nov. 7, 1950

2,528,901

UNITED STATES PATENT OFFICE 2,528,901

COMBINED MANUAL AND FOLLOW-UP PRESSURE FLUID POWER UNIT

John F. Morse, Hudson, Ohio

Application October 6, 1944, Serial No. 557,481

3 Claims. (Cl. 121—41)

The present invention is directed to a combined manual and power operated unit for actuating all types of mechanical installations, but is primarily designed and intended for operating clutch shifting mechanisms or rudder actuating means used in power boats. The power which is employed in the unit is fluid pressure, preferably oil, which is maintained under sufficient pressure to operate the mechanism which is controlled by the actuating unit. The power operated unit is controlled usually by manual means, the arrangement being such that when the device is functioning properly a very light pressure exerted in either direction will cause the fluid pressure to act upon the device in that direction. So long as the manual pressure is maintained the power unit will function to move the mechanism controlled thereby, but if the manual pressure is relaxed, the power operated unit will cease to function.

It is also an object of the invention to provide means whereby, should the pressure on the operating fluid be lost, as by a break in the pressure line or failure of the pump, the operator may operate the mechanism controlled thereby in spite of the fact that the fluid pressure has been dissipated.

While other mechanisms of this general type have been known they have not been wholly satisfactory, and it is the object of the present invention to improve upon prior designs by making a more compact, and simpler form of device which will nevertheless operate satisfactorily under all operating conditions. The simplicity of the present design, its compactness, and the fact that it will operate by the exertion of a very light manual pressure are among the advantages of the invention. The device is made of few parts and is therefore relatively inexpensive and easy to maintain in working order.

It is a further object of the invention to devise a manually-controlled fluid operated unit which will ordinarily perform the work required so long as the operator maintains a light pressure upon the hand lever or control device in the direction in which the device is to operate. However, if the manual pressure is relaxed the power unit will immediately cease to function, so that the mechanism will not drift in either direction. This makes the power unit particularly suited and adapted for actuating steering mechanisms and other devices where it is desirable to retain constant and accurate control upon the movement of the mechanism driven thereby.

A further object of the invention is to provide for a limited degree of lost motion between the manual control element and the power operated mechanism so that whenever the pressure fluid should no longer continue to function from any cause, the movement of the manual control element will be immediately transmitted directly through the fluid operated unit. In conjunction with this function, the device is constructed to provide for an immediate opening of a bypass within the device so that oil or other pressure fluid will be instantly supplied to the chamber at the end of the piston which is increasing in volume and therefore no resistance is offered to the manual operation.

These and other and related objects and advantages of the invention will appear from the detailed description of the best known and preferred form of the invention. In the drawings such a preferred embodiment is shown, but it is understood that changes and modifications may be made therein without altering the basic principles of the invention or sacrificing its major benefits.

In the drawings:

Fig. 3 is an enlarged section of the central portion of the device shown in the position the elements will assume when the device is acting in the direction toward the left side of the view;

Fig. 3a is a fragmentary view showing the valve in the position it will assume when the device is acting toward the right;

Fig. 4 is a section through the working or control side of the unit, said view being taken on the line 4—4 of Fig. 2;

Fig. 5 is a section on the line 5—5 of Fig. 2 taken at the approximate center of the unit;

Fig. 6 is a section on the line 6—6 of Fig. 2 taken immediately to the right of the piston;

Fig. 7 is a section on the line 7—7 of Fig. 2 taken immediately to the left of the piston;

Fig. 8 is a section on the line 8—8 of Fig. 2;

Fig. 9 is a section on the line 9—9 of Fig. 2;

Fig. 10 is a view of the piston looking at the top thereof as the parts are located in Fig. 2 and looking directly at the inlet channel;

Fig. 11 is a view of the piston rotated 90° with respect to the showing in Fig. 10, this view looking directly at the outlet channel;

Fig. 12 is a section on the line 12—12 of Fig. 10; and

Fig. 13 is a section on the line 13—13 of Fig. 9.

Figure 1:
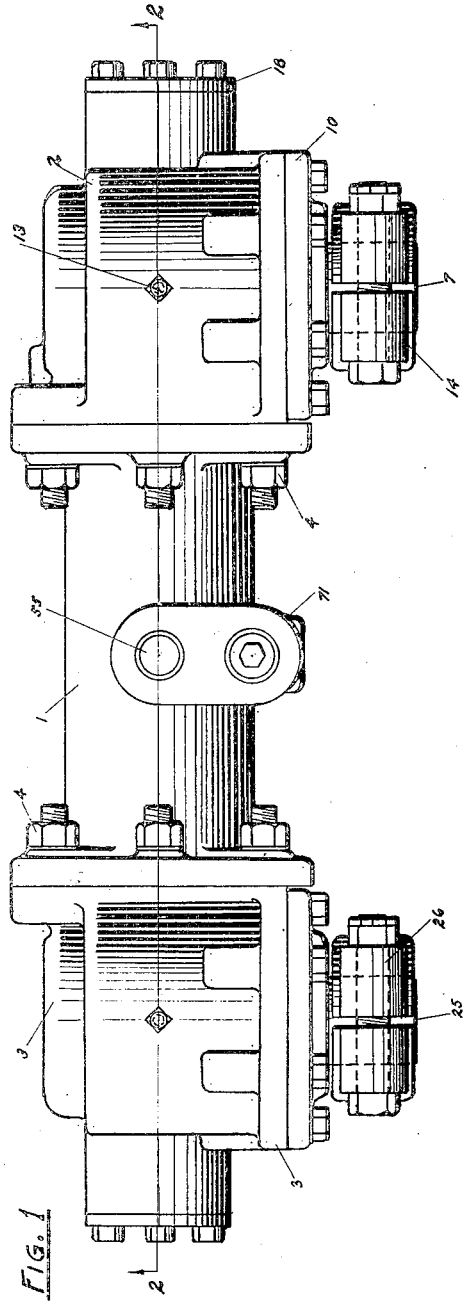
Fig. 1 is a plan view of a representative installation for a complete unit such as might be installed in a power boat for operating the clutch shifting mechanism or the rudder control.

The entire device or unit, illustrated herein as the best known or preferred form of the invention, is enclosed in a casing composed of three main parts, the central or main cylinder 1 which houses the piston, valve and other working parts, a right hand casing or housing 2 which contains the manual control connections and the left hand housing or casing 3 which contains the connections to the mechanism to be actuated or controlled. These three elements of the casing are bolted together to form a fluid tight casing by a series of bolts 4.

In general, the casings 2 and 3 are of the same design and the description of either will suffice, in the main, for both. For the purposes of illustration the control housing is shown in detail in Fig. 4. Within the housing 2 is the chamber 2ª which surrounds the control gear 6 which is mounted upon the control shaft 7 supported by the two ball bearings 8 and 9. The side of the housing through which the shaft 7 projects is closed by the cover plate 10, fluid tight packing rings 12 being inserted about the shaft so that the chamber 2ª is oil tight. A small hole 13 normally closed may be provided for venting the air from the unit when initially installed. A crank 14 is attached to the projecting end of the shaft 7 and this crank may be connected to a lever, wheel or other manual control device not shown.

The gear 6 is in mesh with the longitudinally moving control element or control rack 16 which moves and is guided in the longitudinal bore 17 extending through the housing in a direction at right angles to the axis of the gear 6. The outer or right hand end of the bore 17 is closed by a plate 18, while the opposite end is open to the interior of the cylinder 1. It is understood that the pressure fluid, which is usually a medium machine oil, fills the entire housing and lubricates all of the moving parts. A secondary passage 20 may be drilled from the cylinder 1 to the gear housing for freer circulation of the oil between the casing and the cylinder.

Referring now to the driven or output side of the unit as housed in the casing 3, the driven gear is indicated by the numeral 22 and meshes with the driven element or rack 23 similarly mounted in the casing and likewise oil-sealed. The driven element or output shaft which is connected to the gear 22 is indicated at 25 and a crank is indicated at 26, as illustrative of any mechanical connection to the mechanism to be controlled and operated by the unit.

Located within the cylinder 1 and having a fairly close sliding fit with the interior wall thereof is the piston, indicated in general by the numeral 30. The piston is shown removed from the unit in Figs. 10 to 13. It is capable of movement through substantially the entire length of the bore within the cylinder being moved in either direction through a preponderance of fluid pressure exerted on either end thereof. At its left hand end it is rigidly connected to the driven element 23 by the screw threaded connection 31 shown in Figs. 2 and 3. At the right hand or control end of the unit the piston has a lost-motion connection with the control rack 16 being recessed for this purpose as indicated at 33, a bearing ring 34 being secured to this end of the piston by bolts 35. The inner end of the control rack slides through this ring 34 and is provided with an enlarged head 38 which is somewhat shorter than the recess or chamber 33 so that a limited movement of the rack 16 with respect to the piston is provided. It is during this relative movement that the valve 40 which controls the passage of the pressure fluid is operated.

Figure 2:
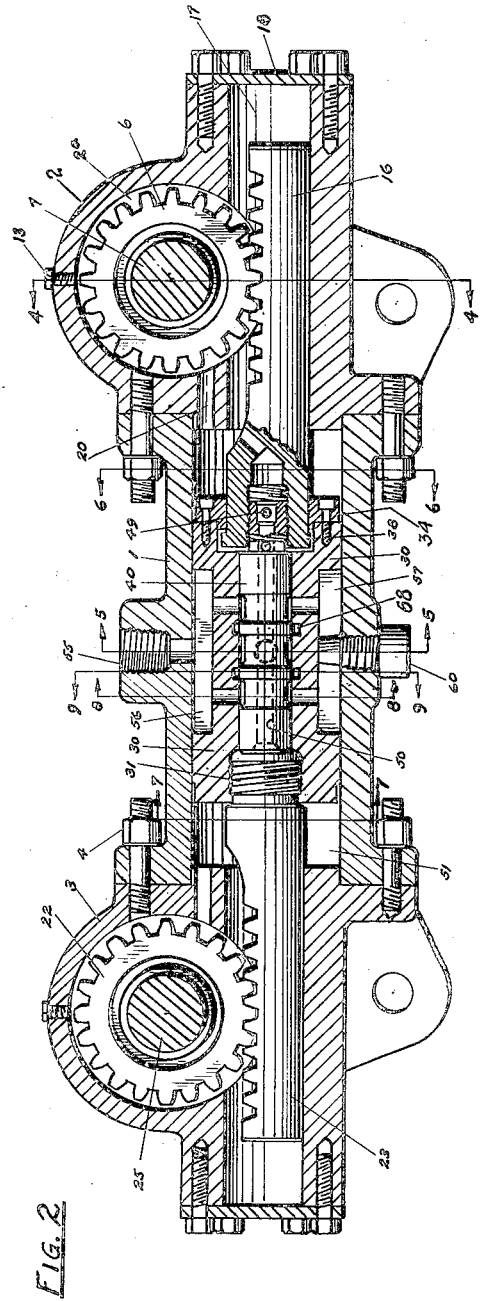
Fig. 2 is a longitudinal section of the unit on the line 2—2 of Fig. 1 showing the various elements in their neutral or non-operating position.

In the normal operation of the unit the head 38 of the control element touches neither the ring 34 nor the adjacent end of the piston 30, the control rack being provided with a sufficient independent movement to operate the valve 40, to be described later in detail, without reaching either limit of its possible movement with respect to the piston. As shown in Fig. 2, when the valve is in closed position the head of the control rack is located at its central position in the chamber 33. When the valve is opened during the fluid actuated movement to the left as shown in Fig. 3 the head of the control rack approaches the end of the piston. On movement to the right the head will approach the inner face of the ring 34.

Should, however, the fluid pressure fail the head will move to its full extent to either side of the chamber 33 and establish a direct mechanical connection between the rack or control element 16 and the piston and this arrangement secures a full manual operation of the unit in an emergency, for in such case the thrust of the element 16 in either direction is transmitted by the piston to the driven rack or element 23. Means are provided, as will be described, for supplying oil or other pressure fluid to the chamber at either end of the piston at such a time, so that there will be no resistance offered by the unit to the complete and easy manual operation through the unit.

The control element or rack 16 is provided at its inner or piston end with an axial bore indicated by the numeral 45 which communicates by the inclined passage 46 with the interior of the cylinder 1. A portion of the bore 45 is screw threaded and in this screw threaded socket is received the reduced screw threaded extension 48 formed as a part of the valve 40. A pin 49 may be inserted through the part 48 and the end of the control element 16 to prevent rotation of the valve. The valve is provided with a central through passage 50 extending from end to end thereof which opens into the space 51 in the far end of the piston where the extension 31 of the element 23 is received. A transverse passage 52 communicating with the passage 50 is located between the main body of the valve and its screw threaded extension, and permits the passage of oil to the chamber 33. By the provision of the passages 50 and 52 the pressure of the oil is equalized on both ends of the valve so that there is no resistance to the movement of the valve in the piston.

Referring now to the piston 30: This element which actuates the driven rack 23 and its connected parts does not require any packing rings as the whole unit is filled with oil and the slight leakage which may occur around the piston does not affect the operation of the device. A central passage or bore 53 is located in the interior of the piston in which the valve 40 has a fairly snug sliding fit. Again packing rings are not necessary between the valve and the surrounding wall of the piston, as any leakage around the valve does not affect the operation of the unit, Oil or other operating fluid, is admitted to the cylinder 1 through a passage 55 which is connected to a pressure line from any suitable pump or other source, not shown. The oil pump is constantly in operation so that pressure is always available as long as the pump is operating. Any suitable device for pumping the oil and relief valve for maintaining a given degree of oil pressure may be employed. This pump will draw from any sump to which oil is discharged from the unit so that the oil is kept in circulation as required. Devices for maintaining constant oil pressures in units of the general type are well known and need not be shown or described.

Oil from the inlet port 55 passes to a longitudinal inlet or pressure channel 56 cut in the surface of the piston. This channel is of sufficient length so that it will always be in communication with the inlet 55 at any position of the piston. A similar channel 57 is located on the opposite side of the piston and spaced transverse inlet or pressure passages 58, which intersect the central longtudinal passage 53, connect the channels. These passages transmit oil from the passage 56 to the passage 57, so that the pressure is always equalized around the piston. A set screw or stud 60 is located in the cylinder 1 opposite the inlet 55, the end of the set screw fitting in the channel 57 and preventing the piston from rotating.

At right angles to the channels 56 and 57 and located midway of the piston is the transverse passage 62 which also intersects the central passage 53 and provides an outlet or exhaust passage for the oil held in either end of the cylinder permitting it to flow to the outlet as the piston is moved in the cylinder. This passage opens at its ends into the two oppositely located outlet channels 64 formed on the outer surface of the piston. These opposed channels serve to balance the piston.

The pressure fluid from either end of the cylinder escapes from the chamber at the end of the piston toward which the piston is moving through longitudinal filling and drain channels 65 cut in the outer surface of the piston. These channels which constitute both the inlet and outlet conduits for the passage of pressure fluid to either end of the piston are preferably in two sets of four each located between the channels 56 and 57 and 64. Each set of channels or conduits terminates short of the central plane of the piston and inwardly of the passages 58. At the right hand end of the piston the ring 34 is similarly channeled as shown at 65$^a$ in Fig. 6. At the inner terminus of each channel 65 a radial passage 66 leads to an annular groove 68 cut in the inner wall of the piston. As shown, especially in Fig. 3, there are two of these grooves which are located on opposite sides of the discharge passage 62.

As shown more particularly in Fig. 5 one of the channels 64 is opposite a discharge port 70 formed in an enlargement 71 which is cast with the cylinder 1 and the channel is of sufficient length so that it is always in communication with the discharge port. The pressure fluid which is discharged ahead of either end of the piston in its movement escapes through a drain pipe attached to the outlet 70 and is delivered to the sump. The entire system is either enclosed or a trap, not shown, may be located in the drain to maintain a full supply of fluid in the system.

Referring to Fig. 5 a bypass is provided between inlet 55 and the port 70, the end of the bypass adjacent the outlet port being reduced to form a seat indicated at 72 on which a ball 74 is seated, this serving as a check valve. Should the pump cease to operate or there be a break in the supply line, this check valve will open to permit the passage of the pressure fluid from the outlet 70 to the inlet 55, the purpose being to supply fluid to the chamber from which the piston is receding. This prevents the creation of a vacuum or the tendency to create a vacuum in the chamber which is increasing in volume due to the travel of the piston and reduces materially the effort which is required to move the piston directly by manual operation.

Referring now to the valve 40 which, as stated, is moved relatively to and within the piston by the manual control element 16; the relative movement of the valve under normal operations with respect to the piston is very limited as is shown by a comparison of Figs. 3 and 3$^a$. It will be appreciated that as the piston moves in either direction the valve will move with it, being maintained in the relative position to which it has been moved by following up the travel of the piston by movement of the manual control element 16. As long as the valve is maintained in its shifted position, the piston will continue to move in the same direction. It is therefore necessary to maintain only a slight pressure on the control element to continue the movement of the piston (and consequently the movement of the rack 23 and its connected elements). If, however, the force exerted on the control element is relaxed, continued movement of the piston will close the passages through the piston and valve and the movement will stop because the valve and piston are then restored to the relative position shown in Fig. 2.

It may be stated that in both Figs. 3 and 3$^a$ the extent to which the valve is opened in either direction of movement is exaggerated for the purpose of making the drawings clearer. In actual service of this unit it is necessary only to "crack" the valve and the piston will start its movement at once. Likewise the cessation of piston movement is practically instantaneous with the relaxing of pressure on the control device. This makes the operation of the unit extremely sensitive and yet there is no tendency for the piston and its connected elements to "drift" for the parts assume a complete balance immediately upon the closure of the valve.

The construction of the valve, which, in combination with the other elements make these desirable results obtainable, will now be described. The ends of the valve 40 close off the bore 53 within the piston. In the longitudinal center of the valve is the annular reduced portion or groove 80 which is opposite the transverse outlet passage 62 and constitutes an outlet or discharge passage. The distance between the extreme edges of this groove may be a few thousandths of an inch less than the distance between the adjacent walls of the transmission grooves 68, just enough so that the grooves 68 are sealed off by the two ridges 82 at either side of the annular groove 80. On either side of the ridges 82 are the two grooves 83 and 84 which form the annular inlet or pressure grooves and are always in communication with their respective transverse passages 58. Each ridge 82 may be slightly wider by a few thousandths of an inch than the width of the grooves 68. It is practical, and to some extent advantageous, to have a slight leakage through the valve as this makes a more sensitive operation possible and avoids any lost motion in cracking the valve.

Résumé

When the valve is in its central or neutral position with respect to the piston, as shown for example in Fig. 2, the ridges 82 either completely or partially close off both transmission grooves 68 so that little or no fluid can flow from the cylinder chamber at either end of the piston. At the same time the pressure fluid is also sealed off or balanced and the parts remain in this position and cannot move until and unless the valve is shifted. If movement of the rack 23 to the left is desired the control element, the rack 16, is moved to the left which, due to the provision for lost motion between the rack 16 and the piston, shifts the valve to the position as shown in Fig. 3. This movement will open the right hand groove 68 so that the fluid under pressure will flow through the right hand passages 58 and groove 84 into the groove 68 and thence through the right hand channels or conduits 65 to the chamber at the right of Fig. 3, so that the pressure fluid propels the piston to the left and this movement will continue as long as the operator follows up the piston movement with corresponding movement of the rack.

However, the instant that the pressure on the rack is released, the movement of the piston will cause the valve to reassume the relative position shown in Fig. 2 and movement will cease. This condition can occur at any point in the translation of the piston.

During the translation of the piston 30 to the left the oil must be discharged from the chamber at the left of the piston and this is accomplished because the transmission groove 68 to the left is uncovered, opening the passage to the central groove 80 in the valve and thence to the discharge port 62. The channels 65 on the left side of the piston now become outlet conduits, conducting the oil from the chamber to the left to the groove 68 to the left.

On movement of the parts to the right, as illustrated in Fig. 3a the left hand groove 68 and its connected conduits 65 become inlet conduits while the corresponding elements on the right become the outlet conduits for the fluid in the right hand end of the cylinder.

As explained above, in the event of failure of the pressure fluid the head of the control element (the rack 16) bears against either the right hand end of the piston or the ring 34 depending upon the direction of movement, and the manual movement is transmitted directly to the piston and thence to the rack 23. During this operation the valve is fully opened so as to provide for the expulsion of the fluid pressure on one side of the piston and the vacuum on the other side of the piston is relieved through the operation of the check valve 72.

As will be noted each moving part is surrounded by the oil or other pressure fluid which acts to lubricate all of the parts. Also in every case the pressure has been balanced so that the movement of the parts is not impeded by any preponderance of pressure at either side thereof. The piston is balanced in its cylinder by the opposite channels 56 and 57. The valve is subjected to equal pressures on all sides and in addition the oil pressure is balanced on either end of the valve. All that is required to operate the device is the application of just sufficient force to move the rack 16 and valve 40 sufficiently to "crack" the valve. The pressure may be very light. Indeed in a device as shown the weight of a finger will cause the entire unit to become operative. Conversely the lifting of the finger will bring the whole device to rest. In the event of failure of fluid pressure the device itself offers little or no resistance to the manual operation of the driven elements directly through the device.

It will be seen that a very simple and efficient unit of this type has been devised. There are few moving parts and the whole structure is compact and cannot get out of order easily. It has many possible uses where it is desired to employ fluid pressure as the active moving element under complete and ready control.

The description and drawings have been detailed to give a full and adequate description of the device, but the invention is not to be understood as limited to following of those details and to be capable of modification and improvement without departing from the principles of the invention as set forth in the appended claims.

What is claimed is:

1. A power actuating device having a cylinder, a piston slidably mounted in the cylinder and a valve slidably mounted in a blind bore in the piston and having an opening communicating from the inner end of said bore to the face of the piston upon which said bore opens, the wall of the cylinder having an inlet port and an outlet port for fluid under pressure, said piston having a longitudinal inlet channel and a longitudinal outlet channel on its outer surface, the inlet channel being continually in communication with the inlet port and the outlet channel being continually in communication with the outlet port at all positions of the piston, said piston also having independent transmission passages leading to opposite ends of the piston, transverse passage means communicating with the inlet channel and a second transverse passage communicating with the outlet channel, means attached to the valve to shift it relatively to the piston to place the transmission passages in communication with either said transverse passage means, or said second transverse passage, selectively, and a driven member attached to the piston.

2. A power actuating device having a cylinder, a piston slidably mounted in the cylinder and a valve slidably mounted in a blind bore in the piston and having an opening communicating from the inner end of said bore to the face of the piston upon which said bore opens, the wall of the cylinder having an inlet port and an outlet port for fluid under pressure, said piston having spaced longitudinal inlet and outlet channels on its outer surface in communication with the inlet and outlet ports respectively at all positions of the piston, said piston also having two sets of independent transmission passages leading, respectively, to opposite ends of the piston, transverse passage means communicating with the inlet channels and a second transverse passage communicating with the outlet channels, means attached to the valve to shift it relatively to the piston to place the transmission passages in communication with either said transverse passage means, or said second transverse passage, selectively, and a driven member attached to the piston.

3. A power actuating device having a cylinder, a piston slidably mounted in the cylinder and a valve slidably mounted in a blind bore in the piston and having an opening communicating from the inner end of said bore to the face of the piston upon which said bore opens, the wall of the cylinder having an inlet port and an outlet port for fluid under pressure, said piston having a longitudinal inlet channel and a longitudinal outlet channel on its outer surface, the inlet channel being continually in communication with the inlet port and the outlet channel being continually in communication with the outlet port at all positions of the piston, said piston also having independent transmission passages leading to opposite ends of the piston, transverse passage means communicating with the inlet channel and a second transverse passage communicating with the outlet channel, means attached to the valve to shift it relatively to the piston to place the transmission passages in communication with either said transverse passage means, or said second transverse passage, selectively, a driven member attached to the piston, a bypass between the outlet and the inlet port, a check valve in said bypass opening toward the inlet port and means permitting said piston and valve to be moved in unison.

JOHN F. MORSE.

REFERENCES CITED

The following references are of record in the file of this patent:

UNITED STATES PATENTS

| Number | Name | Date |
|---|---|---|
| 493,840 | Powers | Mar. 21, 1893 |
| 959,417 | Anderson | May 24, 1910 |
| 1,119,324 | Sprater | Dec. 1, 1914 |
| 1,143,437 | Rice | June 15, 1915 |
| 1,604,545 | Bragg | Oct. 26, 1926 |
| 1,628,603 | Ferris | May 10, 1927 |
| 1,790,620 | Davis | Jan. 27, 1931 |
| 1,830,636 | Bragg | Nov. 3, 1931 |
| 1,851,816 | Dieter | Mar. 29, 1932 |
| 1,864,225 | Williams | June 21, 1932 |
| 1,874,248 | Davis | Aug. 30, 1932 |
| 1,888,091 | Oberhoffken | Nov. 15, 1932 |
| 1,947,991 | Jessup | Feb. 20, 1934 |
| 1,959,177 | Sassen | May 15, 1934 |
| 2,139,965 | Ljungstrom | Dec. 13, 1938 |
| 2,244,770 | Englesson | June 10, 1941 |
| 2,318,258 | Porter | May 4, 1943 |
| 2,366,382 | Burton | Jan. 2, 1945 |

FOREIGN PATENTS

| Number | Country | Date |
|---|---|---|
| 655,892 | France | Dec. 22, 1928 |